UNITED STATES PATENT OFFICE 2,332,482

UNSATURATED NITRO ALCOHOL

Edward F. Degering, West Lafayette, Ind., and Austin Sprang, Cincinnati, Ohio, assignors to Purdue Research Foundation, La Fayette, Ind., a corporation of Indiana No Drawing. Application July 17, 1941,
Serial No. 402,842

4 Claims. (Cl. 260—632)

Our invention relates to new and useful unsaturated nitro alcohols. More particularly, it relates to unsaturated aliphatic nitro alcohols of the formula:

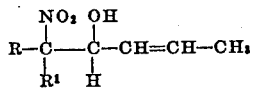

wherein R represents a member of the group consisting of hydrogen and alkyl groups having from 1 to 3 carbon atoms while $R^1$ is a member of the group consisting of hydrogen and methyl.

As examples of unsaturated nitro alcohols of our invention, which are included by the above generic formula, there may be mentioned 1-nitro-3-pentene-2-ol, 2-nitro-4-hexene-3-ol, 5-nitro-2-heptene-4-ol, 5-nitro-2-octene-4-ol, 2-nitro-2-methyl-4-hexene-3-ol, 5-nitro-5-methyl-2-heptene-4-ol, and the like.

The nitro alcohols of the type mentioned may be prepared in accordance with any of the previously known methods for introducing the nitro group into an unsaturated hydroxy aliphatic compound. For example, we have found that such products may be conveniently prepared by condensing a primary or secondary nitroparaffin with crotonaldehyde, in the presence of an alkaline catalyst, and a suitable solvent, such as a lower aliphatic alcohol. This procedure is preferably carried out by slowly adding crotonaldehyde to an alkaline alcoholic solution of the nitroparaffin. During the addition of the aldehyde, the reaction mixture should be thoroughly agitated, and maintained within a temperature range of from 25° C. to not in substantial excess of 45° C. Upon completing the addition of crotonaldehyde, the reaction mixture is generally allowed to stand at room temperature for a period of from four to six hours, after which a sufficient quantity of mineral acid is added to neutralize the alkaline catalyst originally present. The crude reaction mixture is next extracted with a suitable solvent, such as ethyl ether, and the extract dried over sodium sulfate, or other suitable drying agents. The dried extract, thus obtained, is then fractionated under vacuum, and the unsaturated nitro alcohol is secured in substantially pure form. Also, we have found that if either an excess of crotonaldehyde, or nitroparaffin, is used, and the reaction time unduly extended, the resulting product is very viscous. In such instances the residues obtained after distillation were found to be heat stable, insoluble in water, and absorbed bromine at a very slow rate, indicating that reaction very probably occurred at the double bond, giving rise to the formation of products which are considerably more complex than the nitro alcohols ordinarily obtained from such condensation reaction.

We have found it desirable to employ a relatively mild alkaline catalyst, such as potassium carbonate, sodium carbonate, lime, or the like. If stronger alkaline materials are utilized, the final reaction product is generally found to be a very viscous material, which we have been unable to separate into its component parts. The same results have been observed in instances where an extended reaction period has been employed.

The nitroparaffins employed in the preparation of the compound of our invention, may be any of those which possess an active hydrogen atom. In other words, any primary or secondary nitroparaffin will be found suitable for use in the preparation of unsaturated nitro alcohols of the type described. As examples of such nitroparaffins, there may be mentioned nitromethane, nitroethane, 1-nitropropane, 2-nitropropane, 1-nitrobutane, 2-nitrobutane, 1-nitropentane, and the like.

The following examples disclose certain of the new unsaturated nitro alcohols, and their preferred methods of preparation. However, it is to be understood that these examples are merely illustrative, and do not in any way limit the scope of our invention, since we have found that the general class of compounds herein described may be prepared in accordance with the procedure set forth above.

EXAMPLE I

To a solution consisting of 15.25 parts of nitromethane, 25 parts of methanol, and 1.5 parts of potassium carbonate, was added dropwise 17.5 parts of crotonaldehyde. During the addition of the aldehyde, the reaction mixture was thoroughly agitated, and the temperature maintained at approximately 30° C. After the entire quantity of aldehyde had been added, the resulting mixture was allowed to stand at room temperature for approximately four hours, after which it was precisely neutralized by addition of 2.75 parts of 30% hydrochloric acid. The neutralized mixture was extracted with several portions of ether, which were then combined and dried over sodium sulfate. The dry ethereal solution was then distilled under vacuum, and the 1-nitro-3-pentene-2-ol, collected.

EXAMPLE II 5-nitro-5-methyl-2-heptene-4-ol was prepared by adding, with thorough agitation, 17.5 parts of crotonaldehyde to a solution consisting of 25.75 parts of 2-nitrobutane, 25 parts of methanol, and 1.5 parts sodium carbonate. The reaction conditions and procedure employed for isolating the unsaturated nitro alcohol, were identical in all material respects with those described in Example I.

The unsaturated nitro alcohols of our invention absorb bromine readily, and are, in general, stable at temperatures not in substantial excess of 135° C. Above this temperature, however, such products tend to decompose into tarry materials, water, and volatile substances of an undetermined character.

The following data were obtained for certain of the unsaturated nitro alcohols prepared in accordance with the procedure outlined above:

Table

| Compound | Boiling point, °C. | $d_{25°}^{25°}$ | $n_D^{25°}$ | Per cent nitrogen | |
|---|---|---|---|---|---|
| | | | | Found | Theoretical |
| 1-nitro-3-pentene-2-ol. | 92 (2 mm.) | 1.1171 | 1.4668 | 10.16 | 10.68 |
| 2-nitro-4-hexene-3-ol. | 98 (2.5 mm.) | 1.0540 | 1.4542 | 9.35 | 9.78 |
| 5-nitro-2-heptene-4-ol. | 92 (1.6 mm.) | 1.0664 | 1.4493 | 8.67 | 8.82 |
| 5-nitro-2-octene-4-ol. | 109 (2 mm.) | 1.0773 | 1.4495 | 7.75 | 8.09 |
| 2-nitro-2-methyl-4-hexene-3-ol. | 101 (2 mm.) | 1.0387 | 1.4541 | 8.50 | 8.81 |
| 5-nitro-5-methyl-2-heptene-4-ol. | 110 (2.5 mm.) | 1.0547 | 1.4549 | 7.78 | 8.09 |

While the physical constants listed above will undoubtedly be of value in the identification of these nitro alcohols, we do not desire to be restricted to products having the exact properties given since the above data were compiled from single preparations of the compounds listed.

The unsaturated nitro alcohols of our invention serve as useful intermediates in the preparation of numerous nitrogen-containing organic compounds. Other uses of our new products will be apparent to those skilled in the art.

Having now described our invention, what we claim is:

1. An unsaturated nitro alcohol having the structural formula:

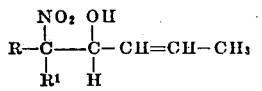

wherein R represents a member of the group consisting of hydrogen and alkyl groups having from 1 to 3 carbon atoms, while R¹ represents a member of the group consisting of hydrogen and methyl.

2. 1-nitro-3-pentene-2-ol.
3. 5-nitro-5-methyl-2-heptene-4-ol.
4. 5-nitro-2-octene-4-ol.

ED. F. DEGERING.
AUSTIN SPRANG.

Certificate of Correction

Patent No. 2,332,482. October 19, 1943.

EDWARD F. DEGERING ET AL.

It is hereby certified that error appears in the printed specification of the above numbered patent requiring correction as follows: Page 2, first column, line 26, in the table, fourth column thereof, for $n_D^{25°}$ read $n_D^{20°}$ and that the said Letters Patent should be read with this correction therein that the same may conform to the record of the case in the Patent Office.

Signed and sealed this 11th day of January, A. D. 1944.

[SEAL]

HENRY VAN ARSDALE,
*Acting Commissioner of Patents.*